United States Patent [19]

Hutter

[11] Patent Number: 4,472,882

[45] Date of Patent: Sep. 25, 1984

[54] SQUARENESS TEST FIXTURE

[76] Inventor: Rudolf J. Hutter, P.O. Box 147, Clinton, Ark. 72031

[21] Appl. No.: 417,395

[22] Filed: Sep. 13, 1982

[51] Int. Cl.$^3$ .............................................. G01B 5/00
[52] U.S. Cl. .............................. 33/174 H; 33/174 Q; 33/476
[58] Field of Search ............ 33/174 Q, 174 H, 143 E, 33/481, 476

[56] References Cited

U.S. PATENT DOCUMENTS

| | | | |
|---|---|---|---|
| 1,148,196 | 7/1915 | Simmons | 33/481 |
| 1,715,405 | 6/1929 | Bull | 33/143 E |
| 3,067,518 | 12/1962 | Herman | 33/174 H X |

Primary Examiner—William D. Martin, Jr.

Attorney, Agent, or Firm—Stephen D. Carver

[57] ABSTRACT

A test fixture adapted to measure the squareness of springs, generally cylindrical objects or the like. Preferably the fixture includes a rigid, planar base adapted to be disposed upon a supporting surface, from which a rigid, calibrated test plate projects generally perpendicularly upwardly. The test plate includes a specially machined testing surface, adapted to contact springs to be tested, which springs can be conveniently supported upon the planar base. The face plate is configured so that springs may be slidingly moved about the base in physical contact with the face to determine their squareness by referring to calibrations provided in the test plate. The surface of the test fixture is described generally by the equation $Z_{(x,y)} = C_1 y (\tan C_2 x + C_3) + C_4$.

8 Claims, 11 Drawing Figures

SQUARENESS TEST FIXTURE

BACKGROUND OF THE INVENTION

The present invention relates generally to test fixtures. More particularly, the present invention is concerned with a test fixture for measuring the squareness of springs, cylindrical objects or the like.

The "squareness" of a spring is becoming an increasingly important factor. As will be appreciated by those skilled in the art, manufactured springs deviate from perfect squareness for a variety of reasons. Deviation occurs because, for example, of the characteristic resiliency of the wire or cable wound to produce the spring. A variety of other factors may also effect the characteristics of the spring product. In a perfectly "square" spring its flat ends will be parallel with one another, and both will be perpendicular with respect to the axis of the spring. In other words, a perfectly square spring will be generally of the form of a cylinder. However, in actual practice, the ends of the manufactured spring are not perpendicular to the spring axis; thus a deviation in squareness occurs.

Those skilled in the art have long been familiar with such deviation. For most manufacturing purposes deviations in squareness of approximately Two to Four degrees have been acceptable. However, increasingly precise squareness tolerances have been demanded in modern products requiring precision springs. For example, it is not uncommon to find that required spring squareness deviation must be within limits less than One degree.

Hence it is desireable to provide some form of test fixture with which the "squareness" of a spring may be quickly and easily checked by the manufacturer. The closest "prior art" known to me involves dissimilar apparatus only vaguely related to my invention, shown in U.S. Pat. Nos. 1,148,196 and 1,699,619.

SUMMARY OF THE INVENTION

The present invention comprises a squareness test fixture for measuring the deviance of a manufactured spring from a theoretical "cylindrical" configuration.

To this effect the apparatus contemplates a rigid planar base adapted to be disposed upon a supporting surface. A rigid test plate projects generally perpendicularly upwardly from the test base. A forward shelf area of the base may receive a spring to be tested. An outwardly projecting test surface defined on the test plate is configured such that an imperfect spring may be moved in contact with it to determine its deviance from squareness. The upper portion of the test plate and the test surface are preferably calibrated in degrees, to facilitate read-out of the squareness deviation of the tested spring. The test surface may be generally described by the equation $Z_{(x,y)} = C_1 y (\tan C_2 X + C_3) + C_4$.

In operation, a spring is first placed upon the test shelf and rotated against the test surface such that maximum spring deviance is observed with the eye. Once this occurs, the spring may be slided gently along the test surface (upon the shelf) until its edge rests flushly against the test surface. At this point, the operator may observe the calibration provided upon the test plate to determine the squareness deviation.

Thus a broad object of the present invention is to provide a test fixture for determining "squareness deviation" of springs or other generally cylindrical objects.

More particularly, it is an object of this present invention to quickly and easily determine manufacturing imperfections in the squareness of springs or other generally cylindrical objects.

A still further object of the present invention is to provide a handy and useful tool which will quickly and easily enable even an unskilled spring manufacturer to examine the squareness of his springs.

Another object of this present invention is to provide a squareness test fixture which will quickly measure the squareness deviance of a spring or other cylindrical object.

Yet another object of the present invention is to provide a squareness test fixture of the character described which may be configured as desired according to a precise mathematical formula to measure the squareness deviation of springs of a wide variety of sizes, proportions and/or configurations.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 2:
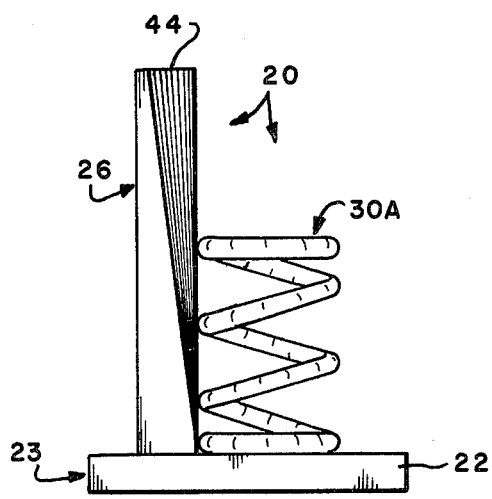
FIG. 2 is a side view taken from a position taken generally from the left of FIG. 1, but illustrating how a perfectly square spring would appear.
Figure 3:
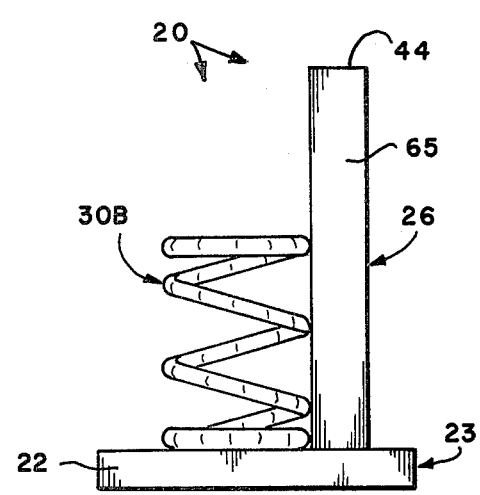
FIG. 3 is a side view taken generally from the right of FIG. 1 (and hence opposite that of FIG. 2) illustrating how a perfectly square spring would appear.
Figure 4:
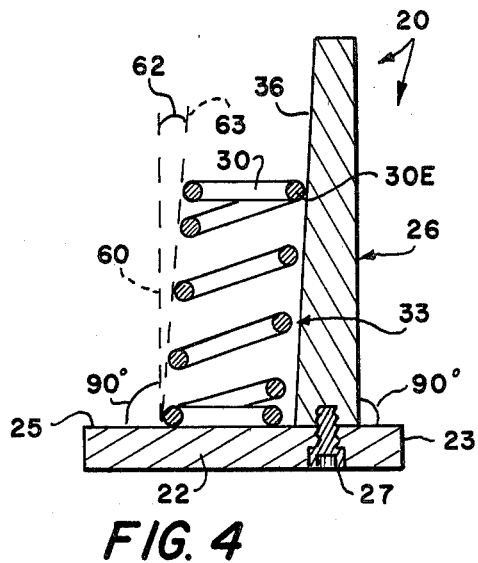
FIG. 4 is a sectional view taken generally along line 4—4 of FIG. 1, particularly illustrating an unsquare spring to be measured, the spring oriented in an initial set-up position.
Figure 5:
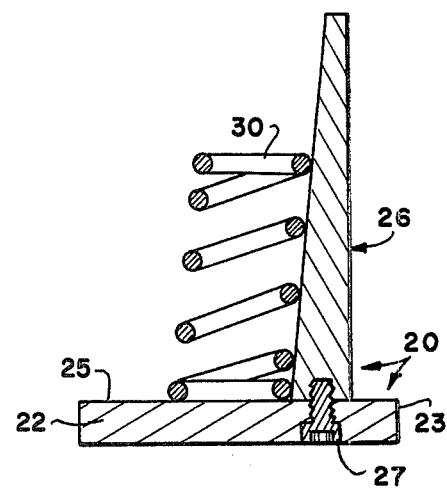
FIG. 5 is a sectional view taken generally along line 5—5 of FIG. 1, illustrating the unsquare spring in a flush position against the test surface, wherein the squareness deviation of the spring may be read directly from the test fixture calibrations.
Figure 6:
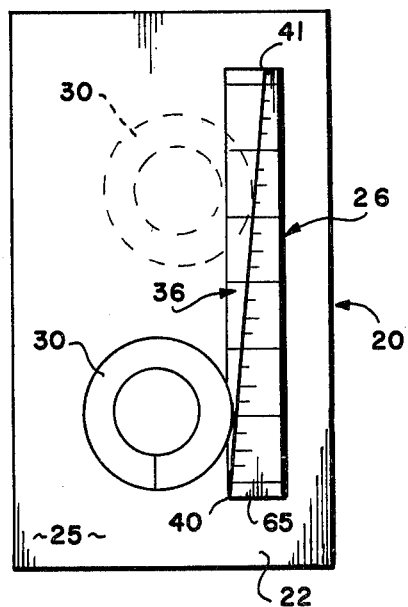
FIG. 6 is a top plan view of the squareness test fixture.

With reference now to the appended drawings, a squareness test fixture constructed in accordance with the preferred teachings of this invention, has been broadly designated by the reference numeral 20. As best viewed in FIG. 1, test fixture 20 preferably comprises a rigid, generally planar, metallic base 22 adapted to be disposed upon a supporting surface 24. A rigid, generally planar test plate, generally designated by the reference numeral 26, is rigidly, perpendicularly secured to base 22 near the rear 23 thereof. To this effect a pair of spaced apart, conventional mounting screws 27, 28 are provided to hold test plate 26 in place. (FIGS. 4,5). Perfectly square springs 30A and 30B are illustrated in place on base 22 in FIGS. 2 and 3.

As best viewed in FIGS. 1 and 4-6, a nonsquare spring, generally designated by the reference numeral 30, is to be tested by the apparatus 20. Spring 30 will first be placed upon the shelf surface 25 of base 22 and pushed flushly against plate 26, making physical contact with the unique test surface 36 thereof. As will be explained hereinafter, the three corners 38, 39 and 40 of plate 26 are all part of surface 36. At these points plate 26 is of maximum width $Z_m$. Surface 36 is configured generally in accordance with the equation $Z_{(x,y)} = Z_m - y \tan(X - X_m)$. Corner 41 is of minimum width. As best viewed in FIG. 1, the top 44 of plate 26 is of generally triangular profile, being of greatest width at corners 40, 39. A plurality of calibrations, generally designated by the reference numeral 48, are provided on surface 44 to enable the operator to read out the squareness of springs to be tested. Major calibration divisions are also indicated on surface 36 with lines 50 through 56 which respectively read out squareness deviations between Zero (0) and Six (6) degrees. In the preferred mode the angular readings vary directly with the X dimension. In other words the indicated angle of deviation varies between zero (0) and six (6) degrees as X varies between six inches and zero. Thus calibration line 50 corresponds to zero degree deviation and X=6 inches; calabration line 56 corresponds to X=0 (i.e. see FIG. 11) and establishes a six (6) degree deviation. The lowermost surface 31 of spring 30 is tilted with respect to the axis of the spring. In FIG. 4 it will be noted that line 60 is perpendicular to base 22 (or surface 25). However, a small angle 62 is defined between perpendicular line 60 and the effective edge 63 of the spring 30. Angle 62 is the squareness deviation which is to be tested or determined by apparatus 20. In the preferred mode $X_{max}$, defined as the maximum value of X, is six (6) inches.

Figure 7:
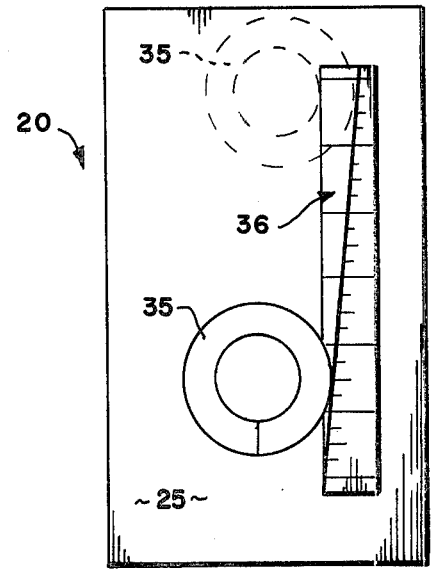
FIG. 7 is a top plan view of my squareness test fixture, illustrating measurement of an extremely "unsquare" spring.

To measure angle 62 the first step is to position the candidate spring 30 toward the right (As viewed in FIG. 1) edge 65 of wall 26, whereupon the spring 30 is manually rotated until the gap 33 between it and surface 36 is maximum. At this time only upper spring edge 30E will touch surface 36. The gap 33 is visually determined, and it is best illustrated in FIG. 4. Afterwards, the operator merely slides spring 30 along surface 36 to the position illustrated in dashed lines (FIGS. 1, 6) wherein spring 30 will lay flush against test surface 36 (FIG. 5). When this occurs, the spring will be positioned immediately adjacent one of the calibration lines 50-56, (or one of the divisions thereof appearing on upper surface 44) and the squareness deviation is revealed. In FIG. 7, an alternative spring, generally designated by the reference numeral 35 of even more non-square characteristics, is illustrated in a read or test position in dashed lines. For purposes of comparison, square springs 30A, 30B appear in FIGS. 2 and 3.

Figure 1:
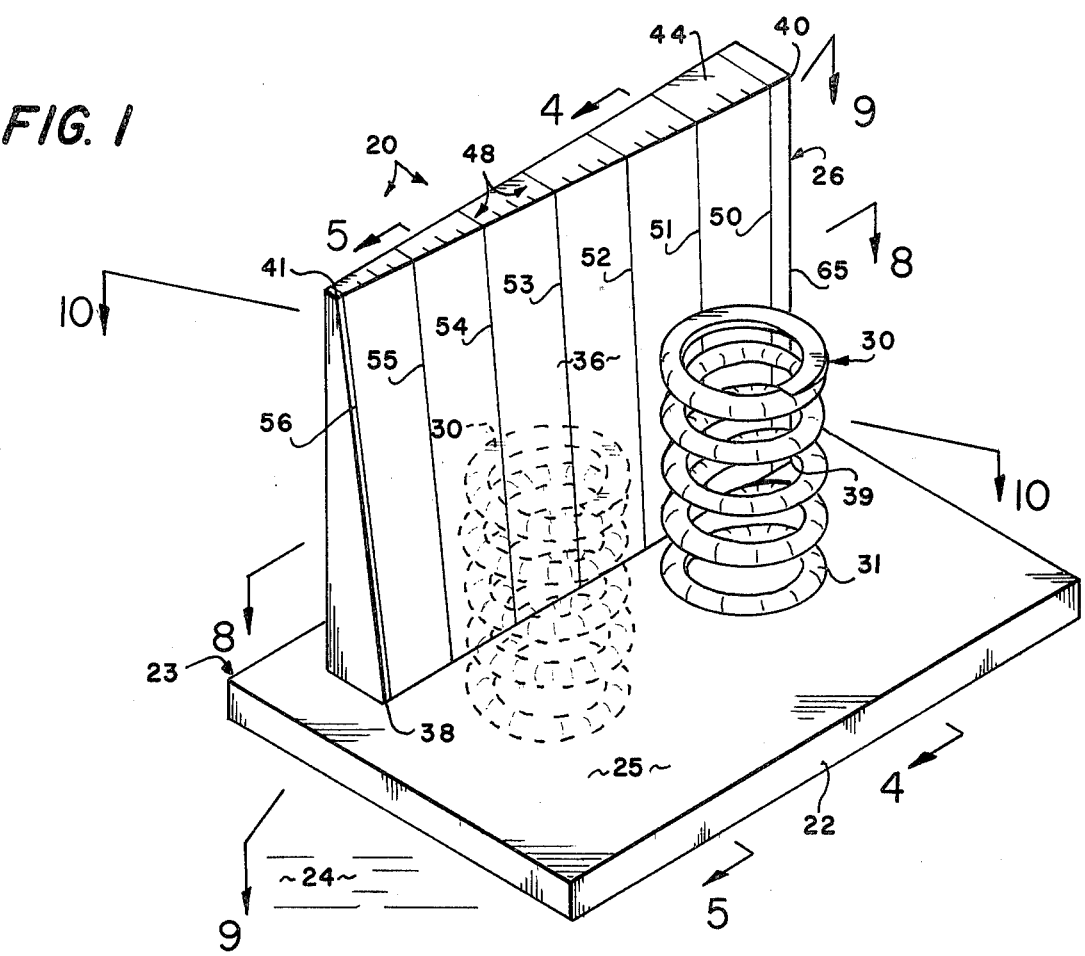
FIG. 1 is an isometric view of a preferred mode of my squareness test fixture, on which a spring is illustrated for testing purposes.
Figure 8:
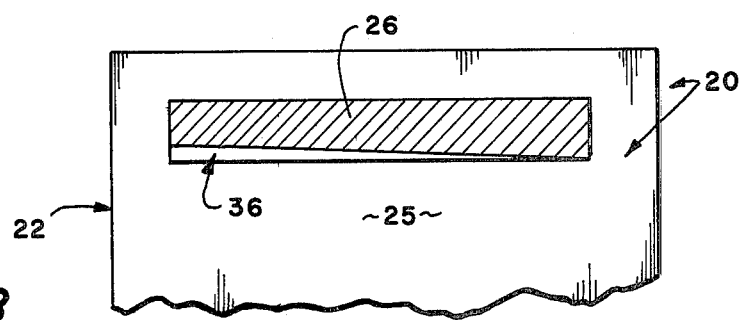
FIG. 8 is a fragmentary sectional view taken generally along line 8—8 of FIG. 1.
Figure 9:
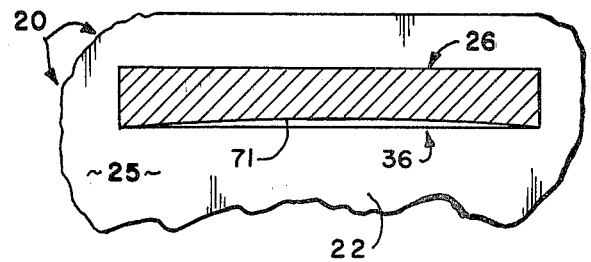
FIG. 9 is a fragmentary, diagonal sectional view taken generally along line 9—9 of FIG. 1.
Figure 10:
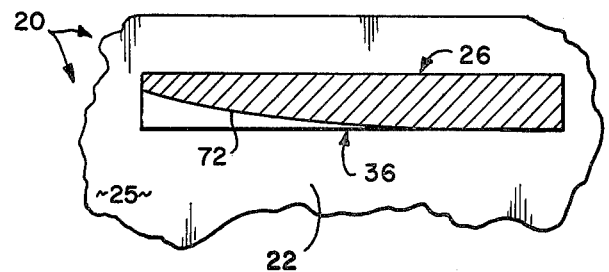
FIG. 10 is a fragmentary, diagonal sectional view taken generally along line 10—10 of FIG. 1; and, FIG. 11 is an enlarged, diagrammatic, isometric view of the test plate illustrating the mathematical basis of the test surface equation.

With reference to FIGS. 8 through 10, the particular geometry of the test surface 36 is illustrated. In particular, a comparison of FIG. 1 with FIG. 8 reveals that although point 41 indicates a minimum thickness point of plate 26, the width of the test plate increases as it approaches base surface 25, With reference to FIG. 9, one diagonal of the test plate 26 is of essentially concave geometry. In particular, the trace 71 which is formed when a cutting plane bisects test plate 26 through line 9—9 in FIG. 1 is generally concave. However, with reference to FIG. 10, a cutting plane through the opposite diagonal reveals a generally convex trace 72, which is generated by the intersection of surface 36 with a cutting plane bisecting plate 26 through line 10—10 in FIG. 1.

Figure 11:
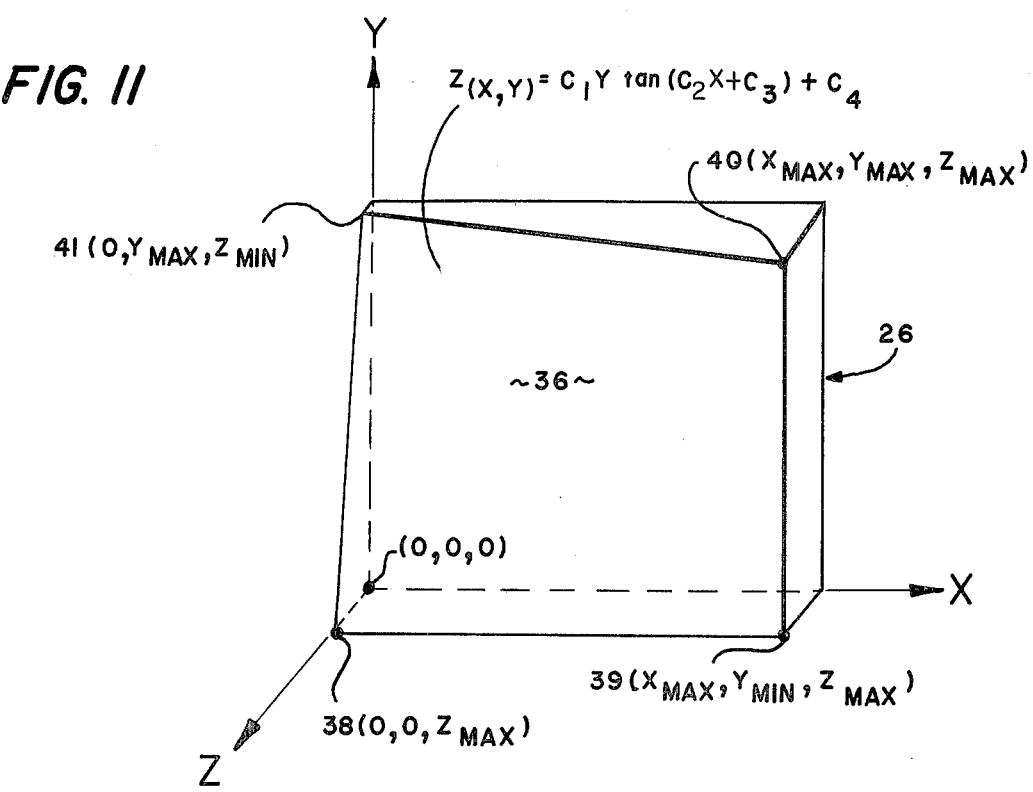

The surface 36, may be best understood mathematically by reference to FIG. 11, wherein the X, Y, and Z coordinates are illustrated. It will be apparent that for all values of Y=0, Z is constant at $Z_{max}$. The general equation of surface 36 is $Z_{(x,y)} = I - C_1 y (\tan C_2 X + C_3) + C_4$. Point 41 actually corresponds to a poin where X is zero, Y is maximum, and Z is minimum. Surface 36 also intercepts points 38 (0, 0, $Z_{max}$); 39 ($X_{max}$, 0, $Z_{max}$); and 40 ($X_{max}$, $Y_{max}$, $Z_{max}$) In the "best mode" of operation known to me at this time, a suitable test fixture has been successfully employed to measure squareness deviations of between 0 and 6 degrees. To this effect I have designed plate 26 with the following parameters: $Z_{max} = 0.724$ inches; $Y_{max} = 5$ inches; and $X_{max} = 6$ inches. One inch along surface 44 (FIG. 1), for exampl corresponds to one degree of deviation. In this fashion, Z varie from a maximum width of 0.724 inches down to appoximately 0.198 inches, in accordance with the general equation discussed above. In this best mode, the surface equation specifically is $Z_{(x,y)} = 0.724 - Y \tan(6 - X)$.

Obviously, if springs of smaller squareness deviation are to be tested within more precise limits, the surface 36 may be ground with a less radical slope. To accomodate other springs of larger sizes, or of greater squareness deviation, it will be apparent that the dimensions in all reference directions (FIG. 11) may be increased radically.

To manufacture plate 26, suitable steel plate stock is set appropriately within a conventional grinder. To test for deviations between zero and m degrees, I prefer that the x dimension of plate 26 ideally be m inches. Then grinding across the surface commences as the plate is linearly moved, with the grinding angle being linearly related to plate movement. Thus the grind angle will vary linearly with grinder movement between 0 and m inches between 0 and m degrees.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A test fixture for measuring the squareness of springs and other generally cylindrical objects, the fixture comprising:

a generally planar, rigid base adapted to be disposed upon a supporting surface; and, a rigid, generally planar test plate secured to said base in generally perpendicular relation thereto, said test plate including a specially configured test surface generally defined by the equation:

$$Z_{(x,y)} = C_1 Y \tan(C_2 X + C_3) + C_4$$

where

Z, Y and X are variables corresponding respectively to the thickness, heighth, and length of the test plate; and, $C_1$, $C_2$, $C_3$, and $C_4$ are constants.

2. The squareness test fixture as defined in claim 1 including plurality of spaced apart calibration lines associated with said fixture and positioned at points determined by said equation for providing a direct read out of the degree of non-squareness of a tested spring, cylindrical object or the like.

3. The squareness test fixture as defined in claim 2 wherein a first one of said calibration lines is defined upon said fixture at a position corresponding to zero squareness deviation, and successive ones of said calibration lines are linearly spaced apart from said first calibration line proportionally to the length of said test plate to directly read squareness deviation angles.

4. The squareness test fixture as defined in claim 1 wherein said constants are as follows:

$C_1 = -1$; $C_2 = -1$; $C_3 = 6$; and, $C_4 = 0.724$.

5. A test plate for measuring the squareness of springs and disposed upon a generally planar supporting surface in generally other generally cylindrical objects, the test plate adapted to be perpendicular relation thereto, said test plate including a specially configured test surface defined by the general equation:

$$Z_{(x,y)} = C_1 Y \tan(C_2 X + C_3) + C_4.$$

where

Z, Y and X are variables corresponding respectively to the thickness, heighth, and length of the test plate; and, $C_1$, $C_2$, $C_3$, and $C_4$ are constants.

6. The squareness test fixture as defined in claim 5 including plurality of spaced apart calibration lines associated with said test plate and positioned at positions determined by said equation for providing a direct read out of the degree of non-squareness of a tested spring, cylindrical object or the like.

7. The squareness test fixture as defined in claim 6 wherein a first one of said calibration lines is defined upon said fixture at a position corresponding to zero squareness deviation, and successive ones of said calibration lines are linearly spaced apart from said first calibration line proportionally to the length of said test plate to directly read squareness deviation angles.

8. The squareness test fixture as defined in claim 5 wherein said constants are as follows:

$C_1 = -1$; $C_2 = -1$; $C_3 = 6$; and, $C_4 = 0.724$.

* * * * *